(12) United States Patent
Chapman et al.

(10) Patent No.: US 8,213,752 B2
(45) Date of Patent: Jul. 3, 2012

(54) COHERENT OPTICAL MIXER AND A METHOD OF COHERENT DETECTION OF LIGHT

(76) Inventors: David J. Chapman, San Jose, CA (US); David J. Dougherty, Pleasanton, CA (US)

(*) Notice: Subject to any disclaimer, the term of this patent is extended or adjusted under 35 U.S.C. 154(b) by 437 days.

(21) Appl. No.: 12/480,956

(22) Filed: Jun. 9, 2009

(65) Prior Publication Data

US 2010/0014802 A1  Jan. 21, 2010

Related U.S. Application Data

(60) Provisional application No. 61/059,820, filed on Jun. 9, 2008.

(51) Int. Cl.
  *G02B 6/26* (2006.01)
(52) U.S. Cl. .......................................................... 385/17
(58) Field of Classification Search ............... 385/15–17
  See application file for complete search history.

(56) References Cited

U.S. PATENT DOCUMENTS

| | | | |
|---|---|---|---|
| 4,514,054 A | 4/1985 | Stowe | 385/39 |
| 5,003,626 A | 3/1991 | Kuwahara et al. | 398/204 |
| 5,060,312 A | 10/1991 | Delavaux | 398/204 |
| 5,115,332 A | 5/1992 | Naito et al. | 398/202 |
| 5,307,197 A | 4/1994 | Tanabe et al. | 398/205 |
| 6,020,963 A | 2/2000 | DiMarzio | 356/491 |
| 6,859,586 B2 | 2/2005 | Epworth et al. | 385/42 |
| 6,882,781 B2 * | 4/2005 | Ionov | 385/48 |
| 7,280,770 B2 | 10/2007 | Tan et al. | 398/205 |
| 7,327,913 B2 | 2/2008 | Shpantzer et al. | 385/15 |

* cited by examiner

*Primary Examiner* — Eric Wong
(74) *Attorney, Agent, or Firm* — Matthew A. Pequignot; Pequignot + Myers LLC

(57) ABSTRACT

A coherent planar lightwave circuit (PLC) optical mixer chip is described comprising a matched pair of symmetrical four-coupler interferometers for in-phase and in-quadrature detection of two polarization components of light using a polarization diversity arrangement. The waveguide structure of the chip is symmetrical about two orthogonal central axes of the chip, whereby the effect of temperature gradients on the mixer is reduced. A light traveling from an input to an output of any of the two interferometers is cross-coupled by one of the two couplers it passes through, and is bar-coupled by the other of the two couplers, so as to compensate for polarization, wavelength, and manufacturing process dependence of bar-coupling with that of cross-coupling.

20 Claims, 7 Drawing Sheets

COHERENT OPTICAL MIXER AND A METHOD OF COHERENT DETECTION OF LIGHT

CROSS-REFERENCE TO RELATED APPLICATIONS

The present invention claims priority from U.S. application Ser. No. 61/059,820 filed Jun. 9, 2008, entitled "Thermally and mechanically isolated low-cost PLC Package" which is incorporated herein by reference for all purposes.

TECHNICAL FIELD

The present invention is related to coherent detection of an optical signal, and in particular to a planar lightwave circuit (PLC) coherent mixer device with polarization diversity.

BACKGROUND OF THE INVENTION

In optical communication systems, a light signal is encoded with a binary stream of data at a transmitter location and is sent towards a receiver location where it can be decoded, so as to re-create the stream of data at the receiver location. The most direct method of encoding of a light signal is to set an optical power level of the signal in dependence upon the information bit being transmitted. For example, a light source can be turned on when a "one" is being transmitted, and turned off when a "zero" is being transmitted. Alternatively, an optical shutter may be opened or closed. Due to its simplicity, the optical power level modulation, commonly known as on-off keying (OOK), is most frequently used in modern fiberoptic and, or free-space optical communication systems.

The data can also be encoded into a phase shift of a signal. This method is commonly called "phase shift keying" (PSK) and is extensively used in radio frequency communications and broadcasting. In a PSK method, the signal to be decoded is mixed in a coherent mixer device with a local reference signal from a "local oscillator" (LO), which serves as a phase reference, so as to make the two signals interfere coherently with each other. By using the PSK encoding and decoding method, the performance of an optical transmission link can be greatly enhanced as compared to the OOK method, due to increased sensitivity and selectivity of detection, which allows one to increase both overall transmission distance and amount of the data transmitted over a single communication link.

Despite all the advantages and a massive research effort undertaken in the 1980s and 1990s, a PSK encoding and a coherent detection methods have not yet found a widespread application in modern optical communication systems, mostly due to technical difficulties associated with their practical implementation. The difficulties arise from complexity of transmitters and receivers and reliability concerns of data transmission using the PSK method, as compared to the quite reliable and well-established OOK method. Due to the coherent nature of optical interaction of a signal with a reference and resulting sensitivity of the mixed signal to slight fluctuations of the optical path length differences in a coherent mixer, the requirements on mechanical and thermal stability of a coherent receiver are higher as compared to the requirements on stability of a traditional receiver employing the OOK method. Not only that, but the requirements on stability of a LO are very stringent, and an active control of the latter is frequently implemented. Furthermore, the manufacturing tolerances of the mixer optics, which comprise an optical interferometer, are quite tight. The tight tolerances raise manufacturing costs due to reduced manufacturing yields.

One of important challenges of coherent detection is related to instability of polarization of an optical signal being detected. A light wave is a transversal wave; therefore, to make it interfere with a reference light wave to obtain the phase information, the polarization states of the two waves have to be matched. In this regard, it should be noted that a vast majority of fiberoptic networks are implemented using a conventional single-mode optical fiber that does not maintain optical polarization of light passing therethrough, since a polarization state of an optical signal is irrelevant in the OOK detection method, which has already been in practical use when large amounts of the conventional fiber were installed worldwide. Consequently, a polarization state of optical signals used in modern fiberoptic networks is random, and is varying in time. As a result, the amplitude of a signal at the output of a single-polarization coherent mixer varies in time, too, introducing severe fading and even complete signal loss under certain conditions.

A polarization controller may be used to stabilize the polarization state of an incoming optical signal. However, polarization controllers are expensive and complicated devices, and their installation for every optical channel is usually cost-prohibitive. An elegant solution to the polarization instability problem, known in the art as "polarization diversity", is to split the incoming optical signal into two sub-signals having orthogonal states of polarization, and to mix the two sib-signals separately with two reference sub-signals conveniently split from a common reference signal. For example, in U.S. Pat. No. 5,307,197 by Tanabe et al., which is incorporated herein by reference, an optical circuit for a polarization diversity receiver is described, comprising a waveguide-based polarization splitter for splitting the signal into two portions, two optical waveguide couplers for mixing these two portions with a reference signal, and two waveguide-based polarization combiners for combining the signal back into the polarization-insensitive form, to be detected by a double-balanced receiver. Disadvantageously, the waveguide-based polarization splitters and combiners are formed on a $LiNbO_3$ crystal substrate, which rises the manufacturing costs of the device as compared to waveguides implemented on a more widely used silicon substrate.

A coherent optical detector employing polarization diversity is described in U.S. Pat. No. 7,280,770 by Tan et al., which is incorporated herein by reference. The coherent optical detector of Tan et al. combines a single polarization-maintaining waveguide coupler, used for both polarization components of an incoming signal, and a free-space polarization diversity arrangement including a polarizer, a walk-off crystal tilted at 45 degrees, a GRIN lens, and a two-dimensional fiber array for holding output optical fibers. While the detector of Tan et al. only uses one coupler, which is advantageous from the material cost standpoint, one disadvantage of the approach of Tan et al. is the complexity of alignment resulting from a requirement to match the pitch of the two-dimensional fiber array for four output fibers to an output light spot pattern, which depends upon thickness of the walk-off birefringent crystal.

A coherent optical detection apparatus that does not require a polarization diversity arrangement for coherent detection of a randomly-polarized optical signal is described in U.S. Pat. No. 7,327,913 by Shpantzer et al., which is incorporated herein by reference. The coherent optical detector of Shpantzer et al. comprises a four-coupler optical mixer on an electro-optic substrate such as $LiNbO_3$ crystal substrate, wherein all four couplers and at least two phase delay elements, disposed between the couplers, are electrically controlled. A digital signal processor (DSP) is utilized to extract the signal polarization information from two balanced pairs of optical signals at the output of the four-coupler optical mixer chip. The local oscillator polarization and, or the local oscillator phase is adjusted to compensate for thermal drifts and optimize the efficiency of coherent detection. Disadvantageously, the apparatus of Shpantzer et al. requires a complicated fast DSP control circuitry for controlling the coupling ratios of the couplers, the phase delays of the tunable phase delay elements, and polarization of the local oscillator, which raises the cost and complexity of the coherent detector apparatus.

Despite a great variety of devices and methods for coherent detection of light, the practical implementation of coherent transmitters and detectors in optical communication systems has been hindered by such factors as complexity, high cost, environmental instability, and insufficient reliability of data transmission. It is, therefore, an objective of the present invention to provide an inexpensive, low-cost, environmentally stable coherent optical mixer suitable for a large-scale deployment over the existing fiberoptic network infrastructure employing a single-mode non-polarization-maintaining (non-PM) optical fiber. It is further objective of the present invention to provide a reliable and inexpensive method of coherent detection of an optical signal transmitted over a span of a non-PM fiber.

SUMMARY OF THE INVENTION

In accordance with the invention there is provided a planar lightwave circuit (PLC) coherent mixer chip comprising a Y-coupler disposed symmetrically w.r.t. a central longitudinal axis of the PLC chip, for splitting a local oscillator (LO) signal into two reference sub-signals coupled into a pair of matching planar waveguide interferometers disposed symmetrically w.r.t. the central longitudinal axis, wherein each interferometer has two input waveguides coupled to four directional couplers for bar-coupling or cross-coupling of light, wherein the four directional couplers are coupled to two output waveguides, and wherein in operation, a light traveling from any of the input waveguides and into any of the corresponding output waveguides through corresponding two serially connected couplers is cross-coupled by one of the two couplers and bar-coupled by the other of the two couplers, so as to compensate for polarization, wavelength, and manufacturing process dependence of said cross-coupling by the one of the two couplers with the polarization, the wavelength, and the manufacturing process dependence of said bar-coupling by the other of the two couplers.

In accordance with another aspect of the invention there is further provided a coherent optical mixer comprising: the above mentioned PLC chip; an input fiber array optically coupled to the input ports of the PLC mixer chip; an output fiber array optically coupled to the output ports of the PLC mixer chip; and a symmetrical enclosure for holding the input fiber array, the PLC mixer chip, and the output fiber array, and for providing environmental protection thereto, so that a temperature difference between the symmetrical waveguide paths of the PLC chip is less than a temperature difference between non-symmetrical waveguide paths of the PLC chip, and a temperature difference between symmetrical couplers of the PLC chip is less than a temperature difference between non-symmetrical couplers of said chip, due to the symmetry of a temperature distribution inside the enclosure.

In accordance with yet another aspect of the present invention there is further provided a method for coherent detection of an input optical signal comprising:
(a) splitting the input optical signal into first and second input sub-signals, wherein the first and the second input sub-signals have mutually orthogonal polarization states, and modifying the polarization state of the second input sub-signal to match the polarization state of the first input sub-signal;
(b) providing an optical reference signal, and splitting the optical reference signal into first and second reference sub-signals having a polarization state matching the polarization state of the first sub-signal;
(c) providing a PLC chip comprising a pair of matching planar waveguide interferometers disposed symmetrically w.r.t. a central longitudinal axis of the PLC chip, wherein each interferometer has two input waveguides coupled to four directional couplers for bar-coupling or cross-coupling of light, wherein the four directional couplers are coupled to two output waveguides, and wherein in operation, a light traveling from any of the input waveguides and into any of the corresponding output waveguides through corresponding two serially connected couplers is cross-coupled by one of the two couplers and bar-coupled by the other of the two couplers, so as to compensate for polarization, wavelength, and manufacturing process dependence of said cross-coupling by the one of the two couplers with the polarization, the wavelength, and the manufacturing process dependence of said bar-coupling by the other of the two couplers;
(d) applying the first input sub-signal and the first reference sub-signal to the input waveguides of the first PLC interferometer, one signal per one input waveguide;
(e) applying the second input sub-signal and the second reference sub-signal to the input waveguides of the second PLC interferometer, one signal per one input waveguide; and
(f) detecting optical signals emitted by the output waveguides of the two interferometers.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
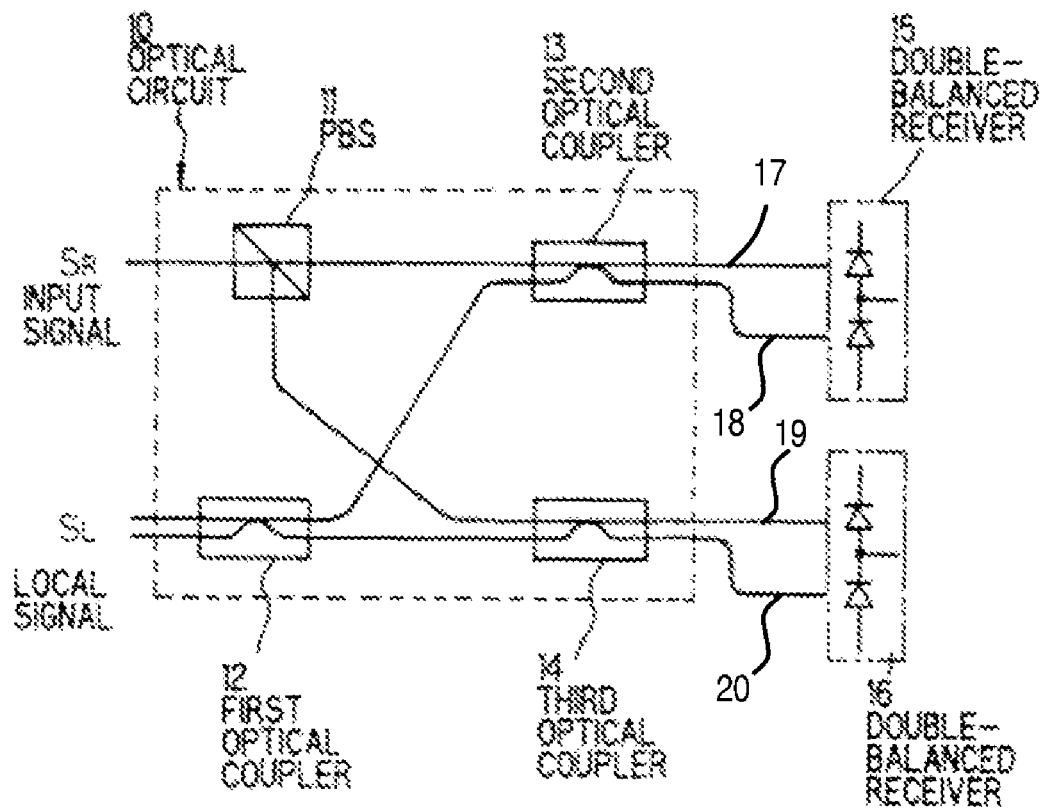
FIG. 1 is a circuit showing a prior-art coherent detector with a polarization diversity arrangement.

Referring to FIG. 1, a conventional optical circuit 10 of a coherent mixer is shown. The circuit 10 uses polarization diversity arrangement including a polarization beam splitter (PBS) 11 for splitting an input signal $S_R$ into two orthogonally polarized sub-signals, that is, TE- and TM-polarized sub-signals, and a first optical coupler 12 for splitting a local signal $S_L$ into two sub-signals. Further, the circuit 10 has second and third optical couplers 13 and 14 for mixing one of output signals of the PBS 11 and one of output signals of the first optical coupler 12, respectively. Output signals of the second and the third optical couplers 13 and 14 are supplied to optical balanced receiver pairs 15 and 16, where the optical signals are converted to electrical signals. The output signal of the coupler 13 is represented by a difference of optical power values in its output waveguides 17 and 18, said optical power values being in a counter-phase relationship, that is, when one is at a minimum, the other is at a maximum, and vice versa. Similarly, the output signal of the coupler 14 is represented by a difference of optical power of light in its output waveguides 19 and 20. The output signals of the couplers 13 and 14 are sensitive to a relative phase φ of the optical signals $S_R$ and $S_L$.

Disadvantageously, the performance of the optical circuit 10 is influenced by environmental parameters such as temperature non-uniformity and mechanical stress in the coherent mixer 10, which cause an unpredictable and time-varying drift of the measured phase shift φ between the optical signals $S_R$ and $S_L$. The drift can be different for the two orthogonally polarized sub-signals, due to temperature gradients across the optical circuit 10, which causes an overall output signal to be additionally influenced by variations of a polarization state of a signal propagating through an entire span of fiber of an external preceding optical link, not shown. Moreover, due to polarization and wavelength dependence of the power splitting ratio of the couplers 12 to 14, the measured value of the phase shift φ will depend not only on polarization fluctuations, but also on the wavelength of the signal. Last but not least, the manufacturing process variations cause variations of the polarization and wavelength dependence of the power splitting ratio from one device to another.

Figure 2:
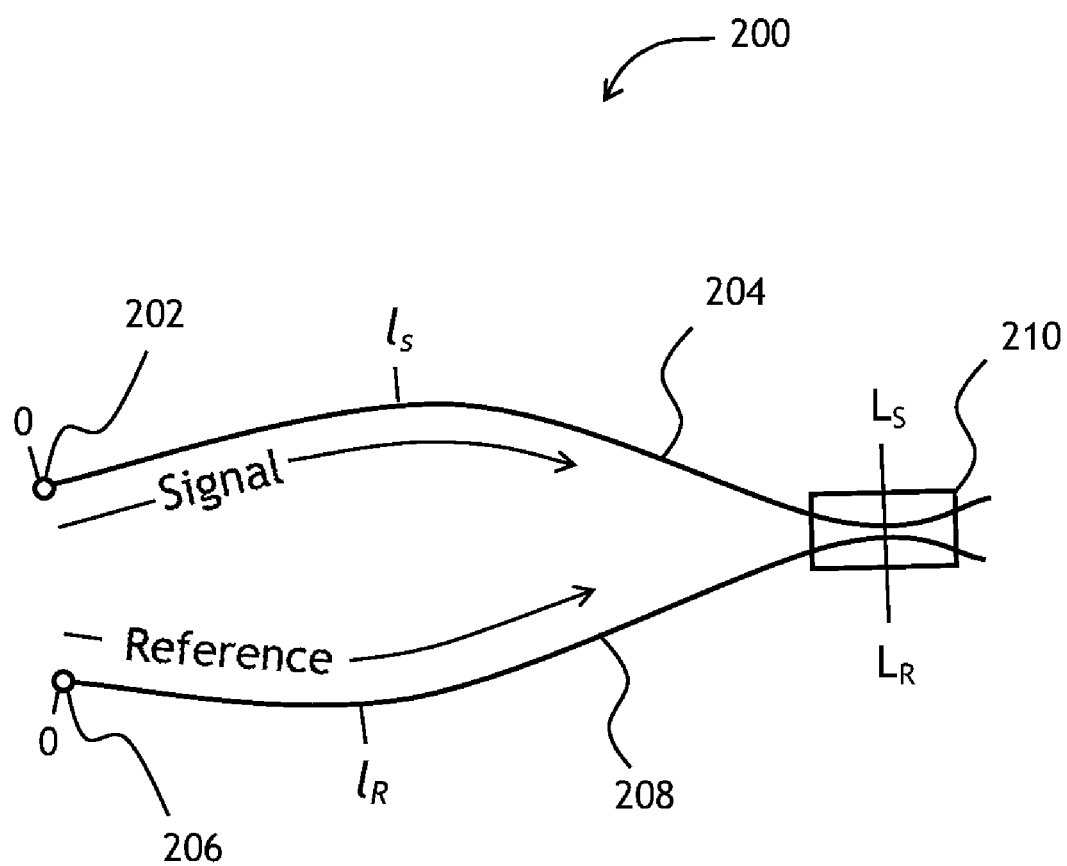
FIG. 2 is a diagram of a waveguide interferometer for coherent detection of an optical signal.

The influence of temperature non-uniformity on a coherent mixer stability will now be explained by the way of an example. Turning to FIG. 2, a diagram of a waveguide interferometer 200 for coherent detection of an optical signal is presented. The interferometer 200 comprises a signal port 202 for receiving an optical signal. The port 202 is optically coupled to a signal waveguide 204; and a reference port 206 for receiving an optical reference is optically coupled to a reference waveguide 208. A coupler 210 is coupled to the waveguides 204 and 208, for coherent mixing of the optical signal and the optical reference. The output signal from the coupler 210 depends on a phase difference $\phi_0$ between the optical signal and the optical reference, and on optical path length (OPL) difference between the waveguide path 204 and the waveguide path 208. The relative phase Φ of optical fields mixed by the coupler 210 can be recorded as $$\Phi \equiv \varphi_0 + \frac{2\pi}{\lambda}(OPL_S - OPL_R) = \quad (1)$$

$$\varphi_0 + \frac{2\pi}{\lambda}\left(\int_0^{L_S} n(T(l_S))dl_S - \int_0^{L_R} n(T(l_R))dl_R\right)$$

where $$OPL \equiv \int_0^L n(T(l))dl$$

is the optical path length, n is a local refractive index dependent on a local temperature T, which, due to temperature non-uniformity in the interferometer 200, depends on a local coordinate $l_S$ along the path 204, and on a local coordinate $l_R$ along the path 208. The coordinate $l_S$ runs from 0 to $L_S$, and the coordinate $l_R$ runs from 0 to $L_R$. When the temperature distribution changes due to changing environmental conditions, the phase Φ drifts, which causes a drift of a coherent output signal.

Figure 3:
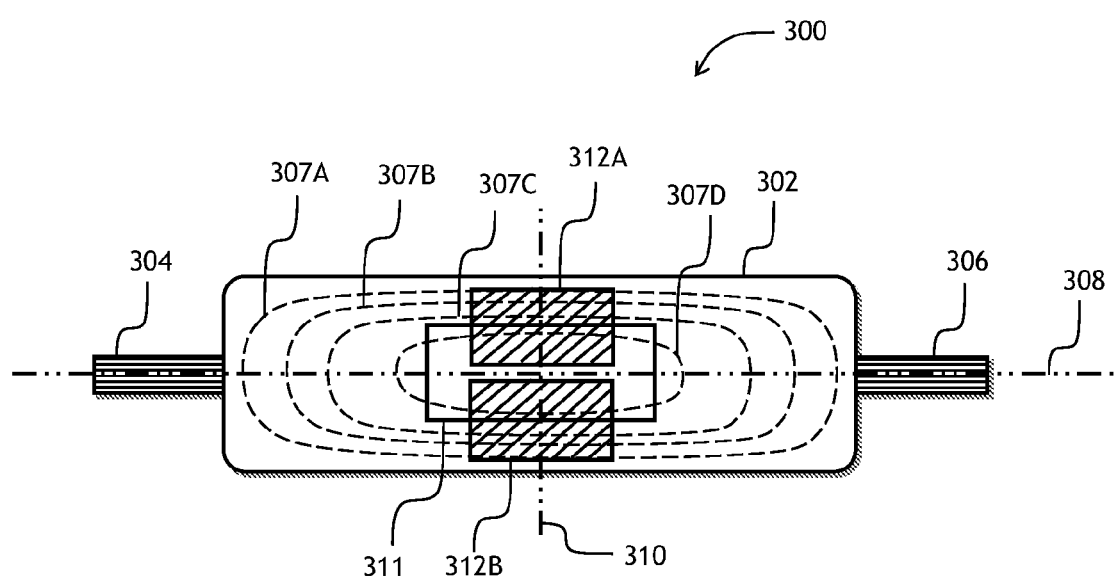
FIG. 3 is a plan view of an enclosure of a planar lightwave circuit (PLC) chip showing a temperature distribution inside the enclosure.

Turning now to FIG. 3, a fiberoptic module 300 is shown comprising a body 302, an input fiber array 304, and an output fiber array 306. A temperature distribution inside the module 300 is illustrated by means of isotherms 307A to 307D. Due to the symmetry of the body 302 around axes 308 and 310, the distribution of temperature tends to be symmetrical around the axes 308 and 310 as well, in absence of air convection or internal heat sources inside the body 302. The mechanical stress can also be symmetrical when a PLC chip is mounted using a symmetrical mount, not shown, inside the body 302.

According to the present invention, the symmetry of the temperature distribution shown by the isotherms 307A to 307D, and, or a symmetry of mechanical stress distribution, not shown, can be taken into account by providing a symmetrical structure of a planar lightwave circuit (PLC) chip matching the symmetrical temperature and, or mechanical stress distribution pattern of the chip. For example, by placing a symmetrical interferometer within an area marked with a rectangle 311, the impact of temperature gradients on the interferometer stability is considerably reduced. The areas denoted by rectangles 312A and 312B can be used when the structure includes two balanced interferometers. In the latter case, one interferometer can be placed inside the area 312A, and the other interferometer can be placed inside the area 312B. Even though there is a temperature gradient present in the areas 312A and 312B, the impact of the gradients in the areas 312A and 312B will be mutually compensated. Of course, the mechanical package and mounting of the PLC chip are preferably constructed so that the peak values of thermal gradients and mechanical stresses are as small as practically achievable.

Figure 4:
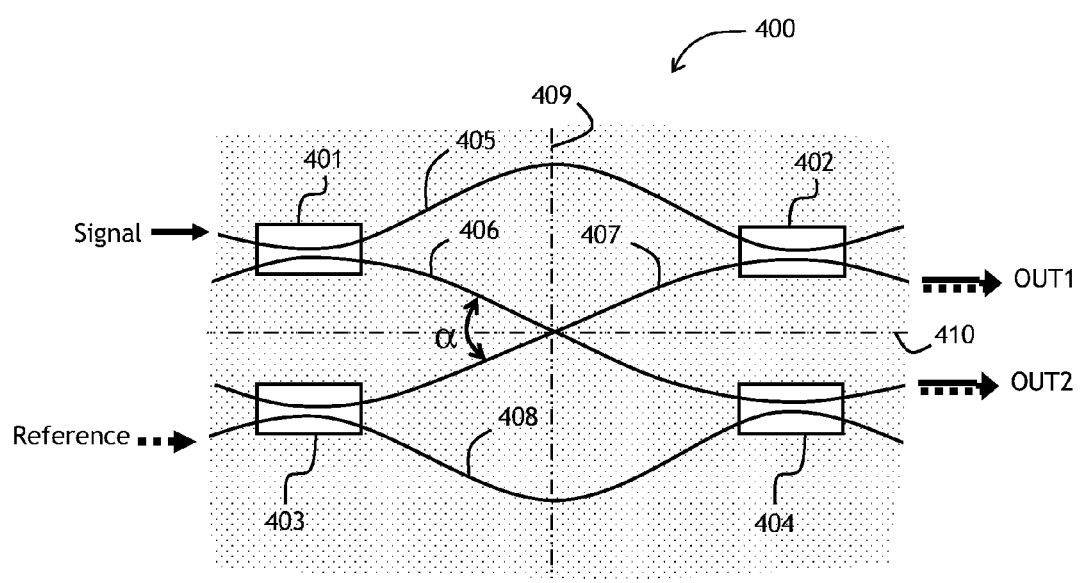
FIG. 4 is a plan view of a four-coupler PLC interferometer according to the present invention.

Turning now to FIG. 4, a four-coupler symmetrical PLC interferometer 400 for coherent detection of an optical signal is shown comprising four evanescent field directional couplers 401 to 404, connected with four waveguides 405 to 408. The structure is substantially symmetrical relative to two axes: a vertical axis 409 and a horizontal axis 410. A Signal and a Reference are applied to the outer waveguides 405 and 408 of the couplers 401 and 403, respectively. Output signals OUT1 and OUT2 of the interferometer 400 are coupled to photodetectors, not shown. The optical path length difference between the waveguides 405 and 407 connecting the coupler 402 to the couplers 401 and 403, respectively, is such that a maximum of the output signal OUT1 at the output of the coupler 402 is reached at a phase difference between the Signal and the Reference equal to $\phi_0$; and the optical path length difference between the waveguides 406 and 408 connecting the coupler 404 to the couplers 401 and 403, respectively, is such that a maximum of the output signal OUT2 at the output of the coupler 404 is reached at a phase difference between Signal and Reference equal to $\phi_0+\pi/2$. The reason for having two phase-shifted paths pairs is that, as the phase difference changes, the optical power of the output signal OUT1 oscillates in a sine-like fashion between a minimum and a maximum value. To resolve the ambiguity in the phase determination around the minima and the maxima of the output signal OUT1 of the coupler 402, another coupler, that is, the coupler 404 is provided. As the phase difference changes, the optical power of the output signal OUT2 of the coupler 404 also oscillates, but with a phase shift of π/2, or in-quadrature with the oscillations of the optical power of the output signal of the coupler 402. By measuring both signals OUT1 and OUT2, commonly called "in-phase" and "in-quadrature" signals, the ambiguity of phase determination is resolved.

Advantageously, the PLC interferometer 400 of the present invention has number of features distinguishing the PLC interferometer 400 from interferometers of the prior art. First, the PLC interferometer 400 is symmetric, which makes it insensitive to symmetric temperature gradients and stress patterns. Preferably, the waveguides 406 and 407 cross each other at a shallow angle α of between 20 and 40 degrees, so as to reduce the width of the interferometer 400 measured along the vertical axis 409. Second, the Signal and the Reference lights, traveling through the interferometer 400, are cross-coupled once by one of the couplers 401 to 404 and are bar-coupled once by another of said couplers, so as to compensate for polarization, wavelength, and manufacturing process dependence of said cross-coupling by the one of the two couplers with the polarization, the wavelength, and the manufacturing process dependence of said bar-coupling by the other of the two couplers. For example, the Signal light on the left-hand side of the interferometer 400 is bar-coupled, that is, propagates in the same waveguide 405 of the coupler 401, and then is cross-coupled, that is, is coupled from the waveguide 405 to the waveguide 407 by the coupler 402 to contribute to the signal OUT1 on the right-hand side of the interferometer 400; the same Signal is cross-coupled by the coupler 401 and bar-coupled by the coupler 404 to contribute to the signal OUT2. Similarly, the Reference light is cross-coupled by the coupler 403 and bar-coupled by the coupler 402 to contribute to the signal OUT1; and bar-coupled by the coupler 403 and cross-coupled by the coupler 404 to contribute to the signal OUT2. The Signal and the Reference lights are applied to the outer waveguides 405 and 408, whereas the OUT1 and OUT2 lights are detected in the inner waveguides 406 and 407. Alternatively, to ensure that each light is bar-coupled once and cross-coupled once, the Signal and the Reference lights can be applied to the inner waveguides 406 and 407, and the OUT1 and OUT2 lights can be detected in the outer waveguides 405 and 408.

As noted, the polarization, the wavelength, and the manufacturing process dependencies of bar- and cross-coupling tend to compensate each other. This occurs for the following reason. The performance of an evanescent field coupler is dominated by the distance between two waveguides brought together in the coupler. This distance determines how much light is coupled from one waveguide to the other. The more light is cross-coupled, the less is bar-coupled, since the total optical power must remain constant according to the law of preservation of energy. Since the waveguides are defined photolithographically and processed together on the same substrate, the distance between the waveguides in different couplers on a particular PLC chip tends to be the same, or very close to one another, across the entire PLC chip. Therefore, the wavelength, polarization, and process dependence of the coupling coefficients of cross- and bar-coupling of various couplers will balance each other when light is bar-coupled by one evanescent field coupler and is cross-coupled by another coupler of the same PLC chip.

The third feature, distinguishing the circuit 400 of FIG. 4 from the circuit 10 of FIG. 1, is that the circuit 400 is constructed to work with a single polarization of light, either TE or TM, which improves stability of the circuit as a whole. To achieve polarization-independent operation of a coherent mixer, a matched pair of circuits 400 is preferably used.

Figure 5:
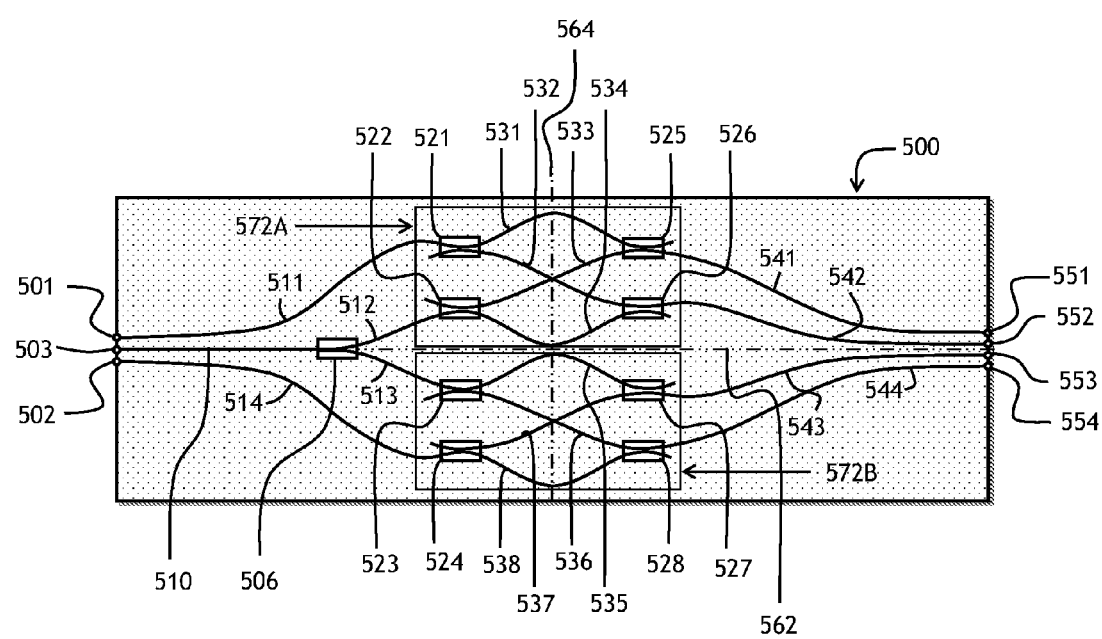
FIG. 5 is a plan view of a PLC coherent mixer chip according to the present invention.

Turning now to FIG. 5, a polarization-independent optical coherent mixer PLC chip 500 according to the present invention is shown comprising a first input port 501 and a second input port 502 for receiving a first and a second portion of an input signal, respectively; a third input port 503, disposed in between the first and the second input ports 501 and 502, for receiving a local oscillator (LO) signal; a Y-coupler 506 for separating the LO signal into first and second LO sub-signals, wherein the Y-coupler 506 has an input optically coupled to the third input port 503 by means of a waveguide 510, and a first and a second output; a first input waveguide 511, a second input waveguide 512, a third input waveguide 513, and a fourth input waveguide 514 for inputting light, optically coupled to: the first input port 501, the first output of the Y-coupler 506, the second output of the Y-coupler 506, and the second input port 502, respectively; a first coupler 521, a second coupler 522, a third coupler 523, and a fourth coupler 524 each having an input for inputting light and a first and a second output for outputting light, wherein the inputs of the first, the second, the third, and the fourth couplers 521, 522, 523, and 524, respectively, are optically coupled to the first, the second, the third, and the fourth input waveguides 511, 512, 513, and 514, respectively; a fifth coupler 525, a sixth coupler 526, a seventh coupler 527, and an eighth coupler 528 each having a first and a second input for inputting light, and an output for outputting light; a first waveguide path 531 for optically coupling the first output of the first coupler 521 to the first input of the fifth coupler 525; a second waveguide path 532 for optically coupling the second output of the first coupler 521 to the first input of the sixth coupler 526; a third waveguide path 533 for optically coupling the first output of the second coupler 522 to the second input of the fifth coupler 525; a fourth waveguide path 534 for optically coupling the second output of the second coupler 522 to the second input of the sixth coupler 526; a fifth waveguide path 535 for optically coupling the first output of the third coupler 523 to the first input of the seventh coupler 527; a sixth waveguide path 536 for optically coupling the second output of the third coupler 523 to the first input of the eighth coupler 528; a seventh waveguide path 537 for optically coupling the first output of the fourth coupler 524 to the second input of the seventh coupler 527; a eighth waveguide path 538 for optically coupling the second output of the fourth coupler 524 to the second input of the eighth coupler 528; a first output waveguide 541, a second output waveguide 542, a third output waveguide 543, and a fourth output waveguide 544 for outputting light, optically coupled to the outputs of the fifth, the sixth, the seventh, and the eighth couplers 525, 526, 527, and 528, respectively; a first output port 551 optically coupled to the first output waveguide 541, for outputting a first phase component of the first portion of the input signal; a second output port 552 optically coupled to the second output waveguide 542, for outputting a second phase component of the first portion of the input signal; a third output port 553 optically coupled to the third output waveguide 543, for outputting a first phase component of the second portion of the input signal; and a fourth output port 554 optically coupled to the fourth output waveguide 544, for outputting a second phase component of the second portion of the input signal.

The first and the second portions of the input signal are the orthogonally polarized components of the input signal in the polarization diversity arrangement, wherein the polarization state of the second component is matched to the polarization state of the first one. More details on the polarization diversity arrangement will be provided below.

According to the present invention, the PLC chip 500 is symmetrical with respect to a longitudinal central axis 562, so that the first waveguide path 531 is symmetrical about the axis 562 with the eighth waveguide path 538; the second waveguide path 532 is symmetrical about the axis 562 with the seventh waveguide path 537; the third waveguide path 533 is symmetrical about the axis 562 with the sixth waveguide path 536; and the fourth waveguide path 534 is symmetrical about the axis 562 with the fifth waveguide path 535. Further, preferably, the first input waveguide 511 is symmetrical about the longitudinal central axis 562 with the fourth input waveguide 514; the second input waveguide 512 is symmetrical about the axis 562 with the third input waveguide 513; the first output waveguide 541 is symmetrical about the axis 562 with the fourth output waveguide 544; and the second output waveguide 542 is symmetrical about the axis 562 with the third output waveguide 543. To preserve the symmetry, the Y-coupler 506 and the waveguide 510 are disposed on the axis 562.

In accordance with the present invention, the symmetry about the axis 562 results in lessening of a temperature difference between the symmetrical waveguide pairs when the PLC chip 500 is placed inside a package having a symmetrical temperature distribution, for example inside the package 300 of FIG. 3, so that temperature effects on the optical path length difference are compensated. Further, by comparing FIG. 4 and FIG. 5, it becomes evident that the couplers 521, 522, 525, and 526 connected with the waveguide paths 531 to 534 of FIG. 5, comprise an interferometer 572A equivalent to the interferometer 400 of FIG. 4. Similarly, the couplers 523, 524, 527, and 528, connected with the waveguide paths 535 to 538 of FIG. 5, comprise an interferometer 572B symmetrical to the interferometer 572A about the axis 562 and equivalent to the interferometer 400 of FIG. 4. Preferably, each of the interferometers 572A and 572B is also symmetrical about a vertical axis 564, so that the symmetry results in lessening of a temperature difference between the symmetrical couplers. To ensure that the temperature-induced optical path length variations are mutually compensated, the interferometer 572A of FIG. 5 is placed at a location corresponding to the location 312A in FIG. 3, and the matching interferometer 572B is placed at a location corresponding to the location 312B in FIG. 3.

Preferably, the second and the third waveguide paths 532 and 533, as well as the sixth and the seventh waveguide paths 536 and 537, cross each other at a shallow angle of between 20 and 40 degrees, so as to reduce the chip width, measured in the vertical direction along the axis 564, of the chip 500, so that the length-to-width ratio of the chip 500 is greater than 4:1. The input and output ports are potential heat and mechanical stress sources. To keep these ports away from the interferometers, a distance between any one port and any one coupler is preferably kept larger than 80% of a distance between the first and the fifth couplers 531 and 535. Further, preferably, the couplers 521 to 528 are 50%/50% evanescent field couplers, or more specifically, the couplers 521 to 524 are 50%/50% evanescent field splitters, and the couplers 525 to 528 are 50%/50% evanescent field combiners. Further, similarly to the interferometer 400 of FIG. 4, the optical path length difference between the paths 531 and 533 differs from the optical path length difference between the paths 532 and 534 by a quarter-wave, so as to provide in-phase and in-quadrature signals of the first polarized signal component at the output ports 551 and 552, respectively; and the optical path length difference between the paths 536 and 538 differs from the optical path length difference between the paths 535 and 537 by a quarter-wave, so as to provide in-quadrature and in-phase signals of the second polarized signal component at the output ports 553 and 554, respectively.

In operation, a light traveling from any of the input waveguides 511 to 514 and into corresponding output waveguides 551 to 554, passes through two serially connected couplers along the light path. According to the present invention, the light is cross-coupled by one of the two couplers and bar-coupled by the other of the two couplers, so as to compensate for polarization, wavelength, and manufacturing process dependence of said cross-coupling by the one of the two couplers with the polarization, the wavelength, and the manufacturing process dependence of said bar-coupling by the other of the two couplers, as has been explained above.

Figure 6:
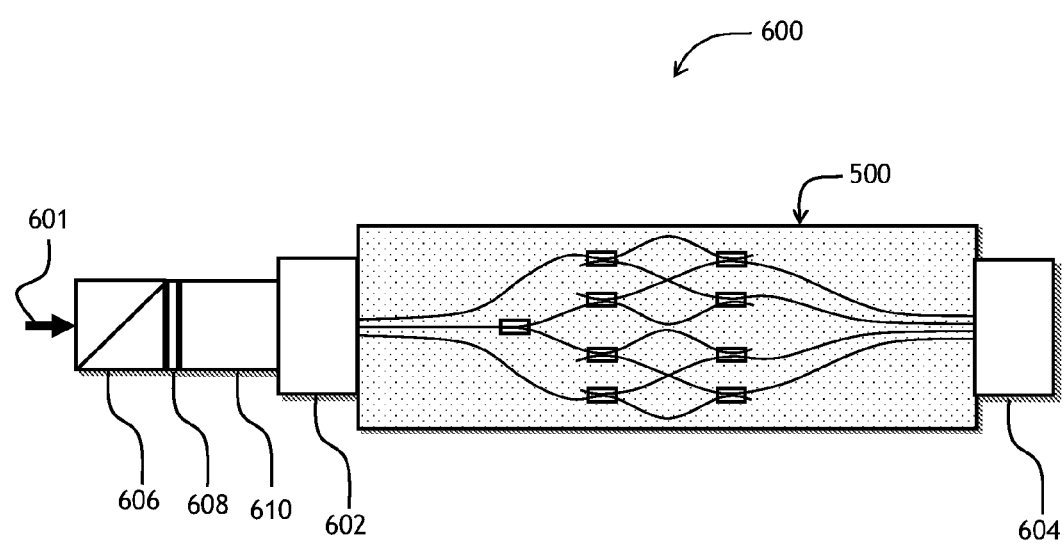
FIG. 6 is a plan view of a coherent optical mixer device according to the present invention.

Referring now to FIG. 6, a coherent optical mixer 600 is shown comprising the PLC mixer chip 500 of FIG. 5, input and output fiber arrays 602 and 604, optically coupled to input and the output ports, not explicitly shown, of the of the PLC mixer chip 500, respectively, an input polarization splitter 606, a waveplate 608, and a LO 610. In operation, an input signal 601 is split by the polarization splitter into two portions having orthogonal states of polarization. The waveplate 608 brings the polarization state of the second portion to match that of the first portion. For example, if the first portion of the input signal is horizontally polarized, and the second portion is vertically polarized at an output of polarization splitter 606, a half-wave waveplate tilted at 45 degrees can be used as the waveplate 608. The waveplate can be placed in the optical path of the second portion to rotate the polarization of that second portion by 90 degrees, to match the horizontal polarization of the first portion of the signal. The polarization splitter 606 and the waveplate 608 comprise, therefore, a polarization diversity arrangement. The LO 610, e.g. a semiconductor laser, provides an optical reference matching the polarization state of the first portion of the signal. All three signals are coupled, by means of the input fiber array 602, to the three input ports of the PLC chip 500. The output fiber array 604 is used to couple the in-phase and in-quadrature signals from the output ports of the PLC chip 500 to four photodetectors, not shown. The fiber arrays 602 and 604 may comprise fibers placed in silicon V-grooves, for example.

Figure 7:
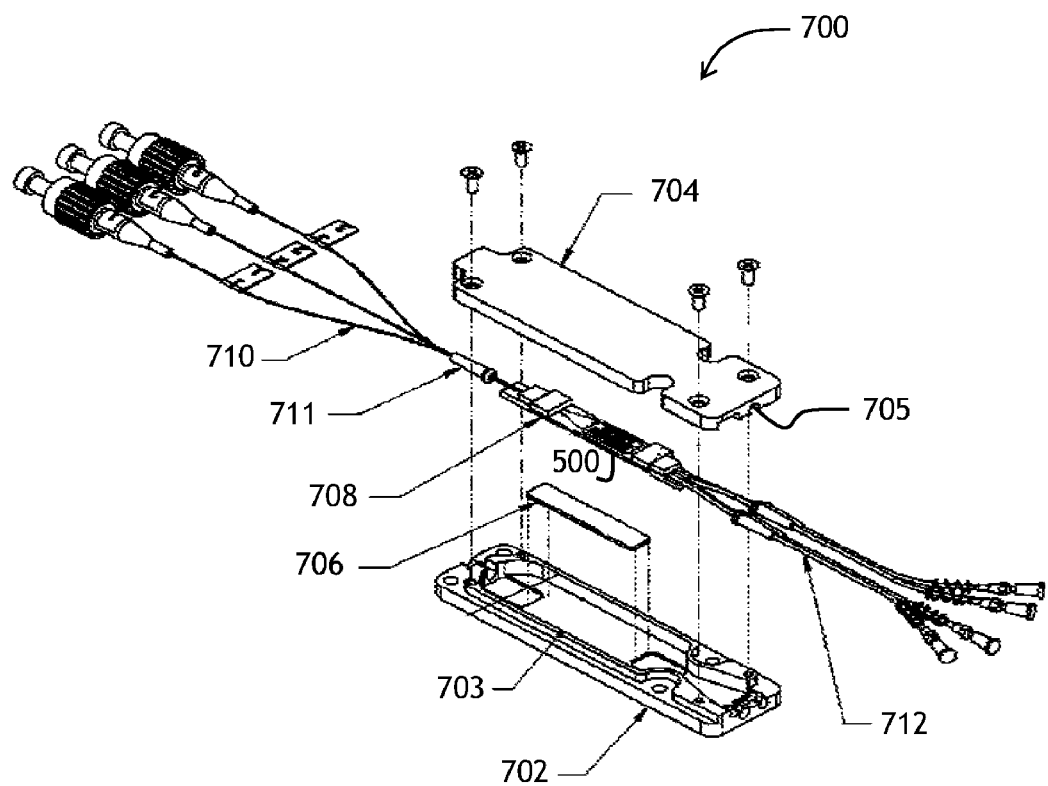
FIG. 7 is an exploded three-dimensional view of a fiber-coupled coherent optical mixer module according to the present invention.

Turning now to FIG. 7, an exploded 3D view of a packaging of a coherent optical mixer module 700 of the present invention is shown comprising an enclosure 702, an enclosure cover 704, a silicone foam mount 706 for mounting a PLC core assembly 708 containing the PLC chip 500 of FIG. 5, three input fibers 710, and four output fibers 712. The enclosure 702 has an interlocking feature 703 for proper positioning the cover 704 on the enclosure 702 for providing an environmental protection to the assembly 708, and in particular for reducing temperature variation across the assembly 708. The fibers 710 have a standard strain relief 711. The enclosure cover 704 has internal flanges 705 for preventing convective air flow in and out of the enclosure 702. The enclosure 702 and the cover 704 are generally constructed so as to provide symmetrical temperature distribution similar to that of the fiberoptic module 300 of FIG. 3. The silicone foam mount 706 provides uniform mechanical stress distribution to the PLC core assembly 708.

Waveguides on the upper surface of the PLC chip 500 must have temperatures within 0.1° C. of one another, to guarantee optical performance of the device 700. The enclosure 702 and the enclosure cover 704 provide required thermal isolation. They also provide mechanical isolation to protect the PLC chip 500 from mechanical shock and vibration. Optical performance of the PLC chip 500 can be affected by mechanical stress. To reduce the mechanical stress, the enclosure 702 incorporates the silicone foam mount 706 that prevents differences in the thermal expansion of the package 702 and the PLC core assembly 708, as well as relieves mechanical stresses due to mounting of the enclosure 702 on a circuit board.

What is claimed is:

1. A planar lightwave circuit (PLC) coherent mixer chip having a longitudinal and a lateral central axis in the plane of the chip, wherein the chip comprises:
    a first and a second input port for receiving a first and a second portion of an input signal, respectively;
    a third input port disposed between the first and the second input ports for receiving a local oscillator (LO) signal;
    a Y-coupler for separating the LO signal into first and second LO sub-signals, wherein the Y-coupler has an input optically coupled to the third input port, and a first and a second output;
    a first, a second, a third, and a fourth input waveguide for inputting light, optically coupled to: the first input port, the first output of the Y-coupler, the second output of the Y-coupler, and the second input port, respectively;
    a first, a second, a third, and a fourth coupler each having an input for inputting light and a first and a second output for outputting light, wherein the inputs of the first, the second, the third, and the fourth couplers are optically coupled to the first, the second, the third, and the fourth input waveguides, respectively;
    a fifth, a sixth, a seventh, and an eighth coupler each having a first and a second input for inputting light, and an output for outputting light;
    a first waveguide path for optically coupling the first output of the first coupler to the first input of the fifth coupler;
    a second waveguide path for optically coupling the second output of the first coupler to the first input of the sixth coupler;
    a third waveguide path for optically coupling the first output of the second coupler to the second input of the fifth coupler;
    a fourth waveguide path for optically coupling the second output of the second coupler to the second input of the sixth coupler;
    a fifth waveguide path for optically coupling the first output of the third coupler to the first input of the seventh coupler;
    a sixth waveguide path for optically coupling the second output of the third coupler to the first input of the eighth coupler;
    a seventh waveguide path for optically coupling the first output of the fourth coupler to the second input of the seventh coupler;
    an eighth waveguide path for optically coupling the second output of the fourth coupler to the second input of the eighth coupler;
    a first, a second, a third, and a fourth output waveguide for outputting light, optically coupled to the outputs of the fifth, the sixth, the seventh, and the eighth couplers, respectively;
    a first output port optically coupled to the first output waveguide, for outputting a first phase component of the first portion of the input signal;
    a second output port optically coupled to the second output waveguide, for outputting a second phase component of the first portion of the input signal;
    a third output port optically coupled to the third output waveguide, for outputting a first phase component of the second portion of the input signal; and
    a fourth output port optically coupled to the fourth output waveguide, for outputting a second phase component of the second portion of the input signal;
    wherein the first waveguide path is symmetrical about the longitudinal central axis with the eighth waveguide path;
    wherein the second waveguide path is symmetrical about the longitudinal central axis with the seventh waveguide path;
    wherein the third waveguide path is symmetrical about the longitudinal central axis with the sixth waveguide path; and
    wherein the fourth waveguide path is symmetrical about the longitudinal central axis with the fifth waveguide path.

2. A PLC coherent mixer chip of claim 1, wherein:
    the first coupler is symmetrical about the longitudinal central axis with the fourth coupler;
    the second coupler is symmetrical about the longitudinal central axis with the third coupler;
    the fifth coupler is symmetrical about the longitudinal central axis with the eighth coupler;
    the sixth coupler is symmetrical about the longitudinal central axis with the seventh coupler;
    the first coupler is symmetrical about the lateral central axis with the fifth coupler;
    the second coupler is symmetrical about the lateral central axis with the sixth coupler;
    the third coupler is symmetrical about the lateral central axis with the seventh coupler; and
    the fourth coupler is symmetrical about the lateral central axis with the eighth coupler.

3. A PLC coherent mixer chip of claim 1, wherein the second and the third waveguide paths cross each other at a first cross point at an angle of between 20 and 40 degrees, and the sixth and the seventh waveguide paths cross each other at a second cross point at an angle of between 20 and 40 degrees, and the first cross point is symmetrical about the longitudinal central axis with the second cross point.

4. A PLC coherent mixer chip of claim 1, wherein the first to the fourth couplers are 50%/50% splitters, and wherein the fifth to the eighth couplers are 50%/50% combiners.

5. A PLC coherent mixer chip of claim 1, having a length-to-width ratio of greater than 4:1.

6. A PLC coherent mixer chip of claim 2, wherein a distance between any one port and any one coupler is larger than 80% of a distance between the first and the fifth couplers.

7. A PLC mixer chip of claim 2, wherein the third input port and the Y-coupler are disposed on the longitudinal axis.

8. A PLC mixer chip of claim 2, wherein:
    the first input waveguide is symmetrical about the longitudinal central axis with the fourth input waveguide;
    the second input waveguide is symmetrical about the longitudinal central axis with the third input waveguide;
    the first output waveguide is symmetrical about the longitudinal central axis with the fourth output waveguide; and
    the second output waveguide is symmetrical about the longitudinal central axis with the third output waveguide.

9. A PLC mixer chip of claim 2, wherein each coupler is an evanescent field coupler for bar-coupling or cross-coupling of light, and wherein in operation, a light traveling from any of the input waveguides and into any of the corresponding output waveguides through corresponding two serially connected couplers is cross-coupled by one of the two couplers and bar-coupled by the other of the two couplers, so as to compensate for polarization, wavelength, and manufacturing process dependence of said cross-coupling by the one of the two couplers with the polarization, the wavelength, and the manufacturing process dependence of said bar-coupling by the other of the two couplers.

10. A PLC mixer chip of claim 9, wherein:
the optical path length difference of the first and the third waveguide paths and the optical path length difference of the second and the fourth waveguide paths differ by a quarter wave; and
the optical path length difference of the sixth and the eighth waveguide paths and the optical path length difference of the fifth and the seventh waveguide paths differ by a quarter wave.

11. A PLC mixer chip of claim 10, wherein the optical path length difference of the first and the third waveguide paths is equal to zero, and the optical path length difference of the sixth and the eighth waveguide paths is equal to zero.

12. A PLC mixer chip of claim 10, wherein:
the first phase component of the first portion of the input signal is an in-phase component of the first portion of the input signal;
the second phase component of the first portion of the input signal is an in-quadrature component of the first portion of the input signal;
the first phase component of the second portion of the input signal is an in-quadrature component of the second portion of the input signal; and
the second phase component of the second portion of the input signal is an in-phase component of the second portion of the input signal.

13. A coherent optical mixer comprising:
a PLC mixer chip of claim 2;
an input fiber array optically coupled to the input ports of the of the PLC mixer chip;
an output fiber array optically coupled to the output ports of the of the PLC mixer chip; and
an enclosure for holding the input fiber array, the PLC mixer chip, and the output fiber array, and for providing environmental protection to the PLC mixer chip.

14. A coherent optical mixer of claim 13, wherein the enclosure is symmetrical about a plane perpendicular to the plane of the PLC mixer chip and containing the longitudinal axis thereof, whereby a temperature difference between symmetrical waveguide paths is less than a temperature difference between non-symmetrical waveguide paths, and a temperature difference between the symmetrical couplers is less than a temperature difference between non-symmetrical couplers.

15. A coherent optical mixer of claim 13, wherein the enclosure comprises at least one internal flange for preventing a convective air flow in and out of the enclosure.

16. A coherent optical mixer of claim 13, wherein in operation, the temperature difference between any two points of the PLC mixer chip is less than 0.1 degree Celsius.

17. A coherent optical mixer comprising:
a polarization beam splitter (PBS) for splitting the input signal into orthogonally polarized first and second portions;
a waveplate optically coupled to the PBS, for modifying the polarization state of the second portion so as to match the polarization state of the first portion of the input signal;
a local oscillator (LO) light source, for providing a reference signal having a polarization state matching the polarization state of the first portion of the input signal;
a PLC mixer chip of claim 2 optically coupled to the PBS, the waveplate, and the LO, wherein, in operation, the first portion of the input signal is launched into the first input port of the PLC mixer chip; the second portion of the input signal, having the polarization state matched to the polarization state of the first portion, is launched into the second input port of the PLC mixer chip; and the reference signal is launched into the third input port of the PLC mixer chip; and
an output fiber bundle optically coupled to the output ports of the of the PLC mixer chip, one fiber per one output port, for outputting the phase components of the first and the second portions of the input signal.

18. A method for coherent detection of an input optical signal, comprising:
(a) splitting the input optical signal into first and second input sub-signals, wherein the first and the second input sub-signals have mutually orthogonal polarization states, and modifying the polarization state of the second input sub-signal to match the polarization state of the first input sub-signal;
(b) providing an optical reference signal, and splitting the optical reference signal into first and second reference sub-signals having a polarization state matching the polarization state of the first input sub-signal;
(c) providing a PLC chip comprising a pair of matching planar waveguide interferometers disposed symmetrically with respect to a central longitudinal axis of the PLC chip, wherein each interferometer has two input waveguides coupled to four directional couplers for bar-coupling or cross-coupling of light, wherein the four directional couplers are coupled to two output waveguides, and wherein in operation, a light traveling from any of the input waveguides and into any of the corresponding output waveguides through corresponding two serially connected couplers is cross-coupled by one of the two couplers and bar-coupled by the other of the two couplers, so as to compensate for polarization, wavelength, and manufacturing process dependence of said cross-coupling by the one of the two couplers with the polarization, the wavelength, and the manufacturing process dependence of said bar-coupling by the other of the two couplers;
(d) applying the first input sub-signal and the first reference sub-signal to the input waveguides of the first PLC interferometer, one signal per one input waveguide;
(e) applying the second input sub-signal and the second reference sub-signal to the input waveguides of the second PLC interferometer, one signal per one input waveguide; and
(f) detecting optical signals emitted by the output waveguides of the two interferometers.

19. A method of claim 18, further including providing a symmetrical temperature distribution of the PLC chip, by providing an enclosure for the PLC chip, wherein the enclosure is symmetrical about a plane perpendicular to the plane of the PLC chip and containing the longitudinal axis thereof, so that a temperature difference between symmetrical couplers and waveguide paths is less than a temperature difference between non-symmetrical couplers and waveguide paths, respectively.

20. A method of claim 19, wherein the temperature of the PLC chip is uniform to within 0.1 degree Celsius.

\* \* \* \* \*